United States Patent Office 3,427,552
Patented Feb. 11, 1969

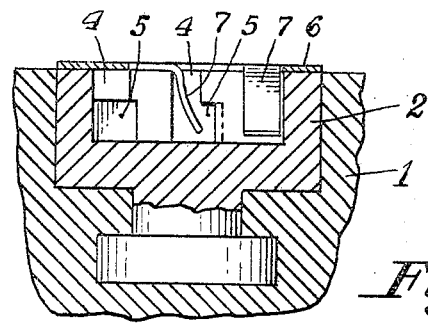
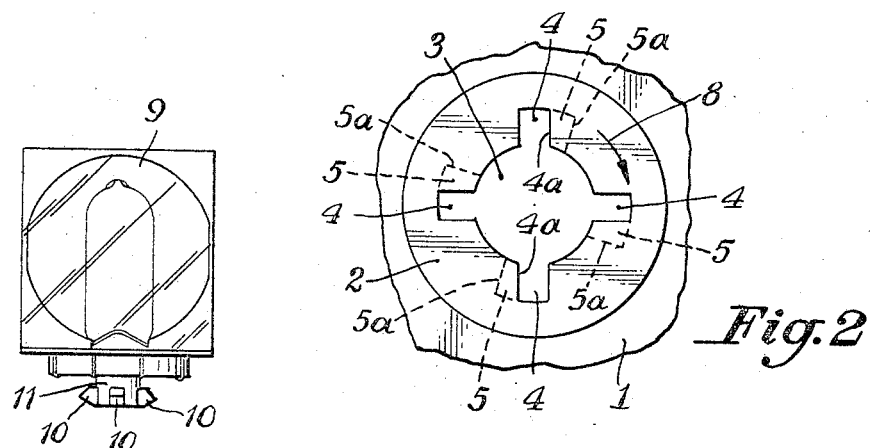
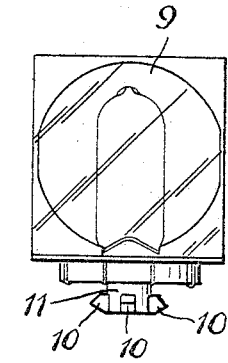
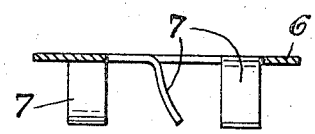
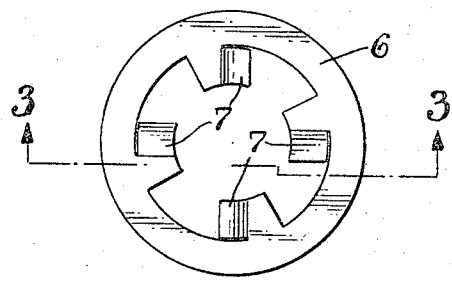

3,427,552
ROTATABLE MOUNT FOR FLASHCUBES
Edgar Sauer, Stuttgart-Rohr, and Gerhard Borner, Musberg, Kreis Boblingen, Germany, assignors to Zeiss Ikon Aktiengesellschaft, Stuttgart, Germany, a corporation of Germany
Filed Mar. 22, 1967, Ser. No. 625,043
Claims priority, application Germany, Mar. 31, 1966,
Z 12,143
U.S. Cl. 339—88                                6 Claims
Int. Cl. H01r 13/54; F16b 9/00; F16l 37/24

ABSTRACT OF THE DISCLOSURE

The rotatable mount for a flashcube is provided on its upper face with a disc from which one or more integral leaf springs extend into the mount opening into which the flash cube is inserted. These leaf springs engage the radial cams on the base of the flashcube and urge the same in engagement with an undercut abutment wall in the mount to lock the flashcube in operative position.

---

The invention relates to a rotatable mount for accommodating a flashcube the base of which is provided with a number of radial cams.

The known means for detachably securing flashcubes in rotatable mounts are relatively complex and rather difficult to mount. Moreover, due to the small dimensions of the flashcube base, the axially effective safety springs which are employed at present are relatively fragile and sensitive.

The invention has as its object to create for a rotatable mount of the type mentioned a securing device for the flashcube base which is of a simple and sturdy construction.

According to the invention, the mount for the flashcube is part of a bayonet clutch provided with an abutment which determines the adjusted position which it forms together with the base of an inserted flashcube.

The invention further provides at least one resilient member which projects into the opening of the rotatable mount, said resilient member upon insertion of a flashcube acts upon the base of the latter so as to rotate the same in locking direction and thereby establishes the bayonet lock and maintains it. In this manner disorders are avoided which may occur when the rotating motion associated with the insertion of a flashcube in the rotatable mount is transmitted to said mount and inadvertently initiates an advancement of it.

The resilient member provided for this purpose may comprise a leaf spring engaging one of the cams of the flashcube. It is possible to provide a leaf spring for each cam on the flashcube base.

The leaf spring or springs, respectively, may also be part of a disc made of a resilient material and placed upon or embedded in the front surface of the rotatable mount, and the spring or springs, respectively, project from the exterior into the opening of the rotatable mount.

The aforedescribed disc may in a particularly simple manner be glued or cemented to the front surface of the rotatable mount.

In the following the invention will be described in further detail with reference to the accompanying drawings from which details of no consequence for the invention have been omitted.

In the drawings:
FIG. 1 is a vertical sectional view of the rotatable mount according to the invention;
FIG. 2 is a top elevation view of FIG. 1, but without the spring disc which is illustrated in FIG. 1 and is adhesively attached to the front face of the mount;
FIG. 3 is a vertical sectional view of the spring disc to be adhesively attached to the front face of the rotatable mount; the section is taken along the line 3—3 of FIG. 4;
FIG. 4 is a top view of the spring disc shown in FIG. 3, and
FIG. 5 is a side view of a conventional flashcube.

Referring to the FIGS. 1 and 2, in a casing 1—which may be the casing of a camera or that of a flash unit—a mount 2 for a flashcube 9 is rotatably positioned in known manner. This rotatable mount 2 is a part of a bayonet clutch whose locked position is determined by an abutment provided in the mount. The mount 2 has a centrally located insertion opening 3 which is open at its upper end and is provided with radial cut-outs 4 for accommodating the radial cams 10 of the flashcube 9. At the bottom of the insertion opening 3 one radial wall 4a of each recess 4 for receiving a radial cam 10 of the flashcube is undercut in circumferential direction as shown at 5. A spring disc 6 adhesively attached to the front surface of the rotatable mount 2 is provided with downwardly extending leaf springs 7 which project into the recesses 4.

The direction of rotation of the rotatable mount 2 is indicated in FIG. 2 by an arrow 8.

When inserting a flashcube 9 into the opening 3 of the mount 2, the radial cams 10 on the base 11 of the flashcube 9 are urged by the leaf springs 7 into the undercut extensions 5 of the recesses 4 until they securely engage the rear walls 5a thereof. Said walls 5a form abutments which determine the locked position of the base 11. In this manner a bayonet connection is established without any rotative forces upon the mount 2 coming into play in the direction of the arrow 8. Rather, the reaction force of the leaf springs 7 becomes effective against the reverse locking means of the rotatable mount 2, which locking means is of known construction.

The used flashcube 9 is removed from the rotatable mount 2 by rotating the flashcube in a direction opposite the one for changing the individual flash bulbs, namely against the reverse locking means of the mount 2.

What we claim is:
1. A rotatable mount for receiving a flashcube the base of which is provided with a plurality of radial cams, the improvement comprising that said mount comprises a rotatable body having a central circular insertion opening with radial recesses extending therefrom for the reception of said base and radial cams of said flashcube, said recesses being each provided with spaced parallel substantially radial walls one of which is undercut to form abutments for said radial cams when said flashcube is inserted into said mount and then rotated until said cams engage said abutments, and spring means in at least one of said recesses and attached to the front face of said mount for engaging the cam inserted into said recess and urging said cam into engagement with its associated abutment.

2. A rotatable mount according to claim 1, in which said spring means comprises a leaf spring engaging with one end said radial cam on the base of said flashcube and being attached with its other end to a plate secured to the front face of said mount.

3. A rotatable mount according to claim 1, in which said spring means comprises a leaf spring forming a part of an apertured disc attached to the front surface of said rotatable mount and projecting from the outside into one of said recesses of said mount.

4. A rotatable mount according to claim 1, in which said spring means comprises an apertured spring disc provided with a plurality of resilient leaf spring portions extending into said recesses of said mount.

5. A rotatable mount according to claim 4, in which said spring disc is adhesively attached to the front surface of said rotatable mount.

6. A rotatable mount according to claim 1, in which the direction of rotation during the insertion of the flashcube in said mount coincides with the direction of advancing the flashcube from one flashbulb to the next.

References Cited

UNITED STATES PATENTS

| | | | |
|---|---|---|---|
| 2,152,125 | 3/1939 | Wulle | 339—90 |
| 3,066,276 | 11/1962 | Hubbell et al. | 339—189 |
| 3,170,748 | 2/1965 | Van Horssen. | |
| 3,319,548 | 5/1967 | Kottler | 95—11 |

FOREIGN PATENTS 5,681  3/1908  Great Britain.

MARVIN A. CHAMPION, *Primary Examiner.*

J. H. McGLYNN, *Assistant Examiner.*

U.S. Cl. X.R.

287—103; 339—147; 285—362; 24—221